Jan. 29, 1946.  F. E. FREY  2,393,857
HYDROCARBON CONVERSION
Filed Dec. 5, 1942
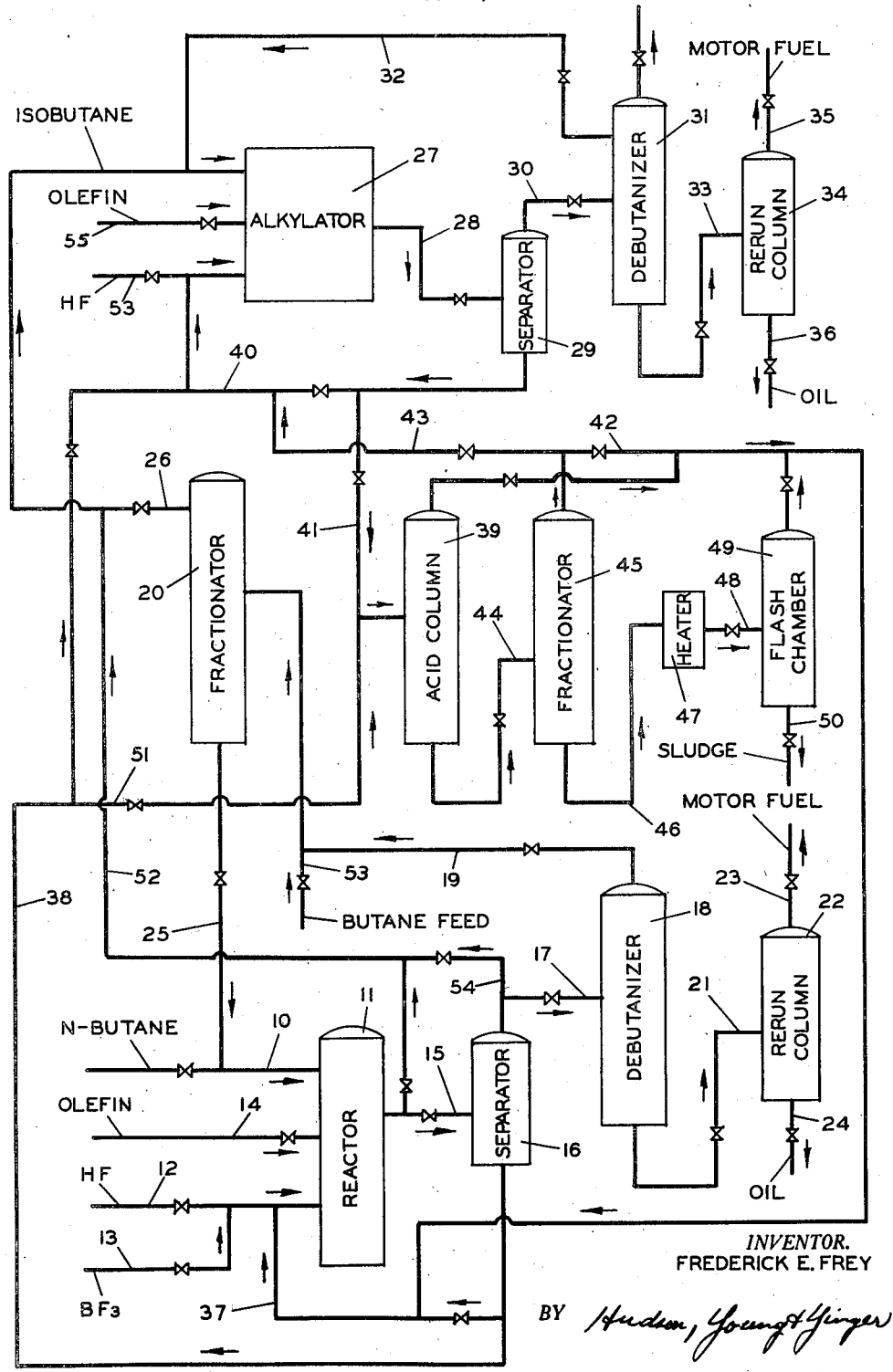
INVENTOR.
FREDERICK E. FREY
BY Hudson, Young & Ginger
ATTORNEYS Patented Jan. 29, 1946

2,393,857

UNITED STATES PATENT OFFICE 2,393,857

HYDROCARBON CONVERSION

Frederick E. Frey, Bartlesville, Okla., assignor to Phillips Petroleum Company, a corporation of Delaware Application December 5, 1942, Serial No. 467,955

3 Claims. (Cl. 260—683.4)

This invention relates to the catalytic conversion of hydrocarbons. It also relates to the conversion of low-boiling saturated and unsaturated hydrocarbons to normally liquid hydrocarbons suitable for use in aviation gasoline. This invention is a continuation-in-part of my copending applications, Serial Nos. 426,627 and 432,679; filed January 13, 1942, and February 27, 1942, respectively.

Many catalytic processes have been proposed for alkylating aromatics and/or isoparaffins with olefins or with olefin derivatives, and some have been proposed for alkylating normal paraffins. For example aromatics such as benzene and paraffins having a tertiary hydrogen atom, such as isobutane, isopentane, methylcyclopentane, and the like, readily undergo alkylation with olefins having more than two carbon atoms per molecule and with secondary or tertiary olefin derivatives in the presence of concentrated sulfuric acid as a catalyst. However, the alkylation of normal paraffins and of branched paraffins not having a tertiary hydrogen atom with such olefins and/or derivatives and the alkylation of isoparaffins having a tertiary hydrogen atom with ethylene and/or primary olefin derivatives are not effectively catalyzed by sulfuric acid. Although alkylation of paraffins not having a tertiary hydrogen atom has been accomplished at relatively high temperatures in the presence of anhydrous aluminum chloride as a catalyst, undesirable side reactions occur to an excessive extent and the consumption of catalyst is relatively high. Grosse and Linn in U. S. 2,267,730 have disclosed the use of concentrated hydrofluoric acid at near-atmospheric temperatures as a catalyst for alkylating isoparaffins with olefins. In the first of my aforementioned copending applications is disclosed a process in which normal paraffins are converted to isoparaffins in the presence of hydrofluoric acid. In the second of my aforementioned copending applications is disclosed a two stage process in which, in one stage, normal paraffins are isomerized to isoparaffins in the presence of concentrated hydrofluoric acid, and in a second stage isoparaffins produced in the first stage are alkylated in the presence of concentrated hydrofluoric acid. It now appears that normal paraffins are more easily and more efficiently converted by alkylation and/or by isomerization by a catalyst comprising concentrated hydrofluoric acid to which a minor proportion of boron fluoride has been added than by concentrated hydrofluoric acid alone. Further, it appears that, although normal paraffins may be alkylated directly in the presence of hydrofluoric acid to which a minor proportion of boron fluoride has been added, the resulting alkylate is of lower quality than a corresponding alkylate produced by first isomerizing normal paraffins to isoparaffins and then alkylating the resulting isoparaffins. Therefore, it is desirable, in converting normal paraffins to alkylates, to isomerize at least part of said normal paraffins to isoparaffins prior to alkylation.

An object of the present invention is to provide an improved process for converting low boiling normal paraffins to relatively high boiling isoparaffins. It is another object of this invention to effect a conversion of hydrocarbons. Another object of this invention is to convert normal butane in part to isobutane and in part to hydrocarbons boiling higher than normal butane in the presence of hydrofluoric acid to which has been added a minor proportion of boron fluoride, and to alkylate the resulting isobutane in a second or separate alkylating stage. Another object of this invention is to convert in one reaction zone normal pentane to relatively high boiling hydrocarbons and to isobutane and to alkylate the isobutane in a second reaction zone to produce motor fuel ingredients of high octane rating. Another object is to utilize spent catalyst from a reaction zone for converting normal paraffins in a reaction zone for alkylating isoparaffins. Other objects and advantages of this application will become apparent from the accompanying disclosure and discussion.

The present invention comprises converting a low boiling normal paraffin such as normal butane, normal pentane, normal hexane, or the like in part to isobutane in the presence of liquid concentrated hydrofluoric acid to which has been added a minor proportion of boron fluoride, in a first reaction zone, and alkylating the isobutane in a second reaction zone. As a further modification, it comprises using spent catalyst from the first reaction zone as catalyst in the second reaction zone, regenerating catalyst from the second reaction zone, and recycling said regenerated catalyst to the first reaction zone. Preferably, a minor proportion of an olefin is introduced continuously into the first reaction zone, whereby conversion of the normal paraffin to isobutane is greatly facilitated and a minor proportion of alkylate or normally liquid isoparaffins suitable for use in motor fuel are produced concurrently.

An understanding of some aspects of the invention may be aided by reference to the accompanying drawing which is a schematic flow diagram of one arrangement of apparatus suitable for practicing a preferred modification of the invention. Although for the sake of illustration, the following description will be confined mainly to the conversion of normal butane, the invention is broadly applicable to the conversion of normal paraffins.

Normal butane may be introduced through inlet 10 into reactor 11 wherein it is intimately mixed with a catalyst comprising a major proportion of substantially anhydrous hydrofluoric acid introduced through inlet 12 and a minor proportion of boron fluoride introduced through inlet 13. Preferably a minor proportion of an alkylating agent such as an olefin having 2 to 5 carbon atoms per molecule is also introduced via line 14. Although the introduction of a minor proportion of alkylating agent in this stage of the process is not absolutely essential it is preferable because it greatly facilitates the isomerization of normal butane to isobutane and simultaneously produces useful normally liquid isoparaffins, as is more fully disclosed, and claimed, in Gibson Serial No. 467,876, filed December 4, 1942. The alkylating agent should be introduced in such a manner that it becomes rapidly dispersed throughout the reaction mixture. This is desirable in order to avoid high local concentrations of the alkylating agent in contact with catalyst, thereby minimizing undesirable olefin—consuming side reactions such as polymerization and hydropolymerization. The normal butane passed into reactor 11 should be in sufficient excess over the olefin that alkylation and side reactions of the olefin are discouraged relative to isomerization and/or reconstruction of the normal paraffin. Usually the mole ratio of normal butane to olefins in the feed to reactor 11 should be in the range of about 20:1 to 100:1 or more. At low ratios an excessive proportion of normal butane is converted to alkylate in the first stage. Although such alkylate is very useful, the alkylate from the second stage is of higher quality and it is therefore desirable to minimize alkylate production in the first stage. At very high normal butane-olefin ratios the beneficial accelerating effect of the olefin upon the isomerization or reconstruction reaction becomes correspondingly small.

The catalyst preferably may comprise from about .1 to about 10 mol per cent boron fluoride and about 90 mol per cent or more of substantially anhydrous hydrofluoric acid. Since the boron fluoride is the more costly and the more difficultly recoverable of the two components the proportion of boron fluoride should be as low as possible while still maintaining a catalyst of the desired activity. The optimum proportion is usually in the range of about .3 to 3 mol per cent. The exact optimum proportion of boron fluoride is dependent upon specific characteristics of reactants and on the reaction temperature and time. For example the conversion of normal butane is more difficult than the conversion of normal pentane and therefore requires a slightly higher proportion of boron fluoride in the catalyst for equivalent reaction rates at a given temperature. In general increasing the proportion of boron fluoride increases the rate of reaction; however, when the proportion of boron fluoride is greater than that required for a reasonable reaction rate (such that the reaction is substantially completed in about 1 to 100 minutes), excessive side reactions which shorten the catalyst life and produce undesirable components in the products occur. Thus for optimum results the proportion of boron fluoride should be correlated with temperature, reaction time, and specific character of reactants for each individual case. It should be understood that the above-mentioned proportions of boron fluoride refer to proportions of catalyst in an active form. Active forms presumably comprise fluoboric acid, simple boron fluoride-hydrocarbon complexes, and possibly the partially hydrated or hydrolized form. As the boron fluoride-derived components of the catalysts are more readily deactivated by products of undesirable side reactions and the like and are less easily recovered than the hydrogen fluoride compound, the over-all consumption of boron fluoride relative to the consumption of hydrofluoric acid in this stage is somewhat higher than the actual proportions present in the catalyst. As stated hereinbefore, the proportion of boron fluoride, specific nature of reactants, reaction temperature and time are interrelated. The exact optimum conditions for each individual case may be readily determined by trial.

After a suitable reaction time the mixture from reactor 11 is passed through conduit 15 to separator 16 wherein it is separated, as by cooling and/or gravitational or centrifugal means, into two liquid phases. The lighter or hydrocarbon phase is passed through conduit 17 to debutanizer 18 wherefrom a mixture of normal butane and isobutane, containing some hydrofluoric acid, is distilled overhead and is passed through conduit 19 to fractionator 20, and the remaining relatively high boiling fraction is passed through conduit 21 to rerun column 22. From rerun column 22 a major gasoline range fraction of normally liquid saturated hydrocarbons comprising relatively large proportions of highly branched isoparaffins suitable for use in aviation motor fuel is withdrawn, through outlet 23, and a minor relatively high boiling fraction is withdrawn through outlet 24. Normal butane is withdrawn as the kettle fraction from fractionator 20 and is recycled through conduit 25 to reactor 11. Isobutane withdrawn overhead from fractionator 20, and containing some hydrofluoric acid, is passed through conduit 26 to alkylator 27. In alkylator 27 isobutane is alkylated with an alkylating agent such as an olefin having 3 to 5 carbon atoms per molecule in the presence of liquid concentrated or substantially anhydrous hydrofluoric acid as a catalyst. Preferably, the catalyst for the second stage comprises spent catalyst from the first stage. The first stage catalyst must be considerably more active than the second stage catalyst since normal paraffins are much more difficultly reactable than isoparaffins. Hence catalyst which must be withdrawn from the first stage by reason of inactivity is still very active for use in the second stage. In some cases it may be desirable to pass at least a portion of the total effluent of reactor 11 directly to alkylator 27, as from conduit 15 through conduit 52 to conduit 26. Alkylator 27 may consist of any suitable vessel provided with a means of maintaining intimate contacting between isobutane and hydrofluoric acid. The alkylating agent, such as an olefin introduced through conduit 55, should be introduced into alkylator 27 at a point of high turbulence, or multipointwise or in any other manner suitable for rapidly dispersing it throughout the reaction mixture. The temperature may be in the range of about 50 to 200° F., preferably in the range of about 75 to 125° F. The pressure should be sufficient to maintain the reaction mixture in the liquid phase (about 50 to 150 pounds per square inch), and the reaction time should be in the range of about 3 to 30 minutes or more. The volume of catalyst in the reaction zone should be sufficient to form a separate liquid phase, preferably about 0.3 to 1.5 times the volume of hydrocarbon. The mol ratio of isobutane to olefin in the total feed to alkylator 27 should be in the range of about 4:1 to 10:1 or more for a recirculation type alkylator, or about 2:1 to 5:1 or more for a single pass type alkylator with multipoint addition of olefin to the reaction stream. At lower ratios excessive proportions of the desired primary products undergo secondary reactions which produce compounds having relatively low octane ratings. The ratio in the reaction zone will often be 50:1 to 100:1, or more. When the alkylation catalyst used in alkylator 27 is catalyst secured from effluents of reactor 11, the alkylation temperature will generally be appreciably lower than the conversion temperature used in reactor 11.

The reaction mixture from alkylator 27 passes through conduit 28 to separator 29, wherein by cooling and/or gravitational or centrifugal means, it is separated into two liquid phases.

The lighter or hydrocarbon phase passes through conduit 30 to debutanizer 31. From debutanizer 31 an overhead fraction comprising a major proportion of isobutane and a minor proportion of hydrogen fluoride is recycled through conduit 32 to alkylator 27, and the remaining normally liquid hydrocarbons are passed through conduit 33 to rerun column 34. From rerun column 34 a major fraction of normally liquid hydrocarbon suitable for use in aviation gasoline is withdrawn through outlet 35 and a minor fraction of hydrocarbon boiling above the gasoline range is withdrawn through outlet 36.

The heavier or catalyst phase from separator 16 may be recycled through conduit 37 to reactor 11. Preferably however part of this is passed through conduit 38 to alkylator 27 wherein it is used as catalyst for alkylating isobutane. In some instances it may be desirable to pass part of the catalyst through conduit 51 directly to acid column 39. Most of the heavy or hydrofluoric phase from separator 29 is recycled through conduit 40 to alkylator 27 but part is passed through conduit 41 to column 39 for regeneration. From column 39, a relatively minor fraction comprising hydrofluoric acid and boron fluoride is distilled overhead and is recycled through conduit 42 to reactor 11. The kettle or bottom fraction from column 39 is passed through conduit 44 to column 45, wherefrom a fraction of substantially pure hydrogen fluoride is distilled overhead and is returned through conduit 42 to reactor 11. If desired part may be recycled through conduit 43 to alkylator 27. The kettle or bottom fraction from column 45 is passed through conduit 46 to heater 47 wherein it is heated to a temperature in the range of about 200 to 600° F. and preferably in the range of about 350 to 450° F. At such a temperature substantially all the fluorine and most of the boron is liberated as hydrogen fluoride, boron fluoride or organic complexes. The heated material is passed through conduit 48 to flash chamber 49 wherein the volatile fluorine and boron containing materials are passed overhead and returned through conduit 42 to reactor 11 and wherein heavy carbonaceous materials drop to the bottom and are withdrawn through outlet 50.

Many modifications of my invention will be apparent to those skilled in the art. For example instead of operating on a normal butane feed introduced through inlet 10 it may be operated on a mixed isobutane and normal butane feed introduced through inlet 53 to fractionator 20. In another modification normal pentane may be introduced to reactor 11 wherein it is converted principally to isopentane, isobutane and relatively high boiling isoparaffins suited for use in motor fuel. Normal pentane may be recycled to reactor 11, isobutane may be passed to alkylator 27 and the motor fuel fractions may be withdrawn as before. Isopentane so produced may be separated as a product, or may be subjected to alkylation either along with, or separately from, the isobutane. In another modification the total hydrocarbon phase from separator 16 may be passed directly through conduit 54 to alkylator 27. When desired, unreacted normal paraffins may then be separated from the effluents from alkylator 27 and returned to reactor 11 by means not shown in the drawing.

To further illustrate the practicability of my invention the following specific examples are given:

Example I

Normal butane was agitated with approximately an equal volume of concentrated hydrofluoric acid to which had been added 0.8 per cent by weight of boron fluoride, and ethylene, in amount 3.75 per cent by weight of the normal butane, was slowly added to the mixture. The temperature was 119° F. and the pressure was 136 pounds per square inch. After a total reaction time of 95 minutes the hydrocarbon phase was withdrawn for examination. It was found to have the following characteristics:

Composition, weight per cent:
| | |
|---|---:|
| Propane and lighter | 2.3 |
| Isobutane | 40.2 |
| Normal butane | 31.8 |
| Pentanes | 15.4 |
| Hexanes | 7.1 |
| Heavier | 3.2 |
| | 100.0 |

Yield isobutane:
  Weight per cent n-butane in charge__ 41.7
  Weight per cent n-butane converted__ 62.3
Yield alkylate:
  Weight per cent n-butane in charge__ 26.7
  Weight per cent n-butane converted__ 39.9
Octane rating (ASTM blending): hexanes and heavier__ 72.0

For the second or alkylation step, a $C_4$ refinery fraction may be added to isobutane and hydrofluoric acid separated from the above conversion step. For example, a $C_4$ refinery gas was added to a well agitated mixture of isobutane and hydrofluoric acid at a temperature of 67° F. and a pressure of about 52 p. s. i. in a proportion sufficient to make the overall ratio of isobutane to olefin in the feed equal to about 8.4:1. After the reaction was completed, the effluents were separated into a hydrocarbon phase and a catalyst phase and a hydrocarbon phase was analyzed. The following data were obtained:

Yield total alkylate:
Weight per cent olefin charged_____ 174
Weight per cent isobutane consumed
(about)_____ 185
Composition, volume per cent:
Pentanes _____ } 3.0
Hexanes_____ }
Heptanes_____ 9.9
Octanes _____ 84.1
Nonanes_____ 0.9
Decanes _____ 1.1
Heavier _____ 1.0
————
100.0

Aviation gasoline fraction:
Cut point, °F_____ 302
Yield, volume per cent alkylate_____ 98.2
Octane rating (ASTM):
Clear _____ 95.4
1 cc. tetraethyllead_____ 104.3

Based on the foregoing test data the ultimate yields of alkylate from the first and second stages respectively are about 40 and 115 weight per cent of the normal butane converted. By blending the two alkylates together an alkylate having an estimated ASTM octane number (clear) of 90 is obtained.

The proportion of olefin used in the first stage was about three times as high as is desirable for optimum results. However it is evident from this example that normal butane can be converted to isoparaffins of very high anti-knock rating in high yields by the process of my invention.

*Example II*

In a test run to determine the feasibility of alkylating normal butane directly with butylenes in a one stage process, butene-2 was added slowly to a well agitated mixture of normal butane and concentrated hydrofluoric acid to which had been added 1.0 per cent by weight of boron fluoride. The temperature was 128° F., the pressure was 120 pounds per square inch, the average reaction time was 40 minutes, and the over all mol ratio of isobutane to olefin was 10.8. The product was examined and the following data were obtained:

Composition, weight per cent:
Isobutane _____ 38.5
Normal butane _____ 38.2
Isopentane _____ 12.2
Normal pentane _____ 2.0
Hexanes _____ 4.5
Heavier _____ 4.6
————
100.0

Yield, weight per cent olefin charged:
Total alkylate _____ 284
Hexanes and heavier _____ 111
Octane rating (ASTM clear): hexanes and
heavier _____ 68.3

From these data it is evident that only a relatively low grade (low octane number) product can be obtained by alkylating n-butane directly with butylenes in one stage as compared to the two stage process of this invention, which is illustrated in Example I.

*Example III*

Two test runs were made to determine the feasibility of isomerizing normal butane to isobutane by agitating it with concentrated hydrofluoric acid and a minor proportion of boron fluoride in the absence of any added olefin. The following data were obtained:

| | Test No. | |
|---|---|---|
| | 1 | 2 |
| Temperature, °F | 138–144 | 151–174 |
| Reaction time, min | 48 | 45 |
| Catalyst composition, mol. per cent: | | |
| BF₃ | 2.8 | 3.3 |
| HF | 97.2 | 96.7 |
| Total hydrocarbon effluent composition, wt. per cent: | | |
| Isobutane | 4.8 | 10.8 |
| Normal butane | 95.2 | 88.7 |
| Heavier | 0.0 | 0.5 |
| | 100.0 | 100.0 |

It is evident from these data in comparison with the data of stage 1 in Example I and of Example II that the isomerization of normal butane to isobutane is greatly facilitated by gradually introducing a minor proportion of olefin into the reaction mixture.

What I claim is:

1. A process for producing normally liquid isoparaffins boiling in the motor fuel range from normal butane, which comprises subjecting normal butane to isomerization conditions in the presence of an isomerization catalyst comprising liquid concentrated hydrofluoric acid together with between about 0.1 and 3 mol per cent of boron fluoride to produce isobutane, separating from effluents of said isomerization a liquid hydrocarbon phase and a liquid catalyst phase, separating from said liquid hydrocarbon phase isobutane so produced, reacting said isobutane with a low-boiling olefin under alkylation conditions in the presence of the aforesaid catalyst phase as the alkylation catalyst to produce isoparaffins boiling in the motor fuel range, separating from effluents of said alkylation isoparaffins so formed and spent alkylation catalyst, passing said spent catalyst to fractional distillation means and removing as a low-boiling fraction purified catalyst comprising hydrogen fluoride and boron fluoride and as a high-boiling fraction organic impurities, passing said purified catalyst to said isomerization, heating said high-boiling fraction to a temperature between 350 and 600° F. to decompose same forming hydrogen fluoride and boron fluoride, and recovering the last said hydrogen fluoride and boron fluoride and passing same to said isomerization.

2. A process for producing normally liquid isoparaffins boiling in the motor fuel range from normal butane, which comprises subjecting normal butane to isomerization conditions in the presence of an isomerization catalyst comprising more than 90 mol per cent of liquid concentrated hydrofluoric acid together with between about 0.1 and 3 mol per cent of boron fluoride to produce isobutane, separating from effluents of said isomerization a liquid hydrocarbon phase and a liquid catalyst phase, separating from said liquid hydrocarbon phase a fraction comprising isobutane so produced, reacting isobutane contained in said fraction with a low-boiling olefin under alkylation conditions in the presence of an alkylation catalyst comprising at least a portion of the aforesaid catalyst phase to produce isoparaffin hydrocarbons boiling in the motor fuel range, separating from effluents of said alkylation a hydrocarbon fraction comprising isoparaffins boiling in the motor fuel range so produced as a product of the process, separating also from effluents of said alkylation a liquid alkylation catalyst phase, passing at least a portion of said alkylation phase to fractional distillation means and separately recovering therefrom a purified boron fluoride fraction and a purified hydrogen fluoride fraction, passing a portion of said purified hydrogen fluoride fraction to said alkylation step and a further portion to said isomerization step, and passing said purified boron fluoride fraction only to said isomerization step.

3. A process for producing normally liquid isoparaffins boiling in the motor fuel range from a low-boiling normal paraffin hydrocarbon having at least four carbon atoms per molecule, which comprises subjecting said low-boiling normal paraffin hydrocarbon to isomerization conditions in the presence of an isomerization catalyst comprising more than 90 mol per cent of liquid concentrated hydrofluoric acid together with between about 0.1 and 3 mol per cent of boron fluoride to produce a low-boiling isoparaffin hydrocarbon, separating from effluents of said isomerization a liquid hydrocarbon phase and a liquid catalyst phase, separating from said liquid hydrocarbon phase a fraction comprising a low-boiling isoparaffin hydrocarbon so produced, reacting a low-boiling isoparaffin contained in said fraction with a low-boiling olefin under alkylation conditions in the presence of an alkylation catalyst comprising at least a portion of the aforesaid catalyst phase to produce isoparaffin hydrocarbons boiling in the motor fuel range, separating from effluents of said alkylation a hydrocarbon fraction comprising isoparaffins boiling in the motor fuel range so produced as a product of the process, separating also from effluents of said alkylation a liquid alkylation catalyst phase, passing at least a portion of said alkylation catalyst phase to fractional distillation means and separately recovering therefrom a purified boron fluoride fraction and a purified hydrogen fluoride fraction, passing a portion of said purified hydrogen fluoride fraction to said alkylation step and a further portion to said isomerization step, and passing said purified boron fluoride fraction only to said isomerization step.

FREDERICK E. FREY.